Figure 1:
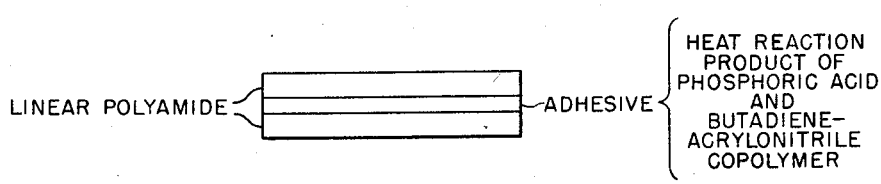

INVENTOR
ALBERIC T. DI MASI

Patented June 6, 1950

2,510,090

UNITED STATES PATENT OFFICE 2,510,090

HEAT REACTION PRODUCT OF PHOSPHORIC ACID AND BUTADIENE-ACRYLONITRILE COPOLYMER AND METHOD OF PREPARATION

Alberic T. Di Masi, United States Navy

Application July 14, 1945, Serial No. 605,164

13 Claims. (Cl. 154—46)

(Granted under the act of March 3, 1883, as amended April 30, 1928; 370 O. G. 757)

My invention relates to adhesive compositions containing unsaturated polymers and, more specifically, it relates to phosphorous acid-modified butadiene-acrylonitrile polymers which are characterized by their stability, self-curability and great adhesive quality when employed as cements and coating or laminating compositions.

Among the many synthetic rubbers or elastomers now available as natural rubber substitutes, there are those generally referred to as the "Buna-N" rubbers which are also sold under various designations as "Hycars." The variety in trade name designations is not indicative of a corresponding variation in composition for all are essentially related in that they comprise copolymers of butadiene and acrylonitrile in various proportions.

One of the shortcomings of the synthetic rubber substitutes or elastomers is their lack of tackiness when incorporated into adhesive compositions. That is to say, the preparation of a good cement using synthetic rubbers as substitutes for natural rubber has not followed directly upon the development of elastomers as rubber substitutes, for the adhesive qualities of the elastomers have not approached those of the natural rubber.

The inadequacy of elastomers, as prepared, in adhesive compositions has received strong emphasis when attempts to use them in various military applications have been made. Their deficiency has been most marked in two respects, first, their lack of strength in laminated structures and, second, their instability in solution as respects gelling, which necessitated the preparation of cements in the form of several ready-to-mix liquid components or solutions rather than as single-solution, ready-to-use cements.

It is an object of my invention to provide a method of modifying butadiene-acrylonitrile polymers to improve markedly their adaptability to incorporation into adhesive compositions.

It is another object of my invention to provide a method of modifying butadiene-acrylonitrile polymers to produce stable polymeric materials which are self-curing in the sense that in compounded form they cure without the application of heat.

It is a further object of my invention to provide as a new product a modified, slightly acid, stable, self-curing, compounded butadiene-acrylonitrile polymer for incorporation into adhesive compositions.

It is still a further object of my invention to provide adhesive compositions which are characterized by their high adhesive strength, self-curing ability and inertness toward hydrocarbon solvents.

Other objects and advantages of my invention will in part be obvious and in part appear hereinafter in the following more detailed description of a few preferred embodiments thereof.

My invention, accordingly, comprises the process of modifying butadiene-acrylonitrile polymers with phosphoric acid which process includes the several steps and the relation of one or more of such steps with respect to each of the others and the product comprising the modified polymer and the adhesive compositions including the modified polymer which possess the features, properties and the relations of constituent elements which are exemplified in the following detailed disclosure and the scope of my invention will be indicated in the claims appended hereto.

Butadiene-acrylonitrile polymers are commonly available on the market in the form of copolymers of butadiene and acrylonitrile in which the ratio of butadiene to acrylonitrile varies considerably, but generally the polymers are of relatively high molecular weights. A typical commercially available butadiene-acrylonitrile polymer is "Hycar OR-15" which material comprises the copolymer of 75 parts by weight of butadiene with 25 parts by weight of acrylonitrile. The compound can be considered as a linear polymer in which butadiene and acrylonitrile molecules are more or less regularly recurrent.

I have discovered that by chemical modification of the type of polymer described, i. e., soft copolymers of butadiene and acrylonitrile, of relatively high molecular weight, i. e., about 50,000–150,000, containing from about 15 to about 50 parts of acrylonitrile, the adaptability of the polymer for use in adhesive compositions can be increased many fold. By reacting a molecule of the general nature of a butadiene-acrylonitrile polymer with a phosphorous acid a reaction occurs which toughens the polymer, makes it more elastic and improves its milling properties, apparently because the number of double bonds in the unit polymer has been diminished.

My invention will be more clearly understood by reference to the following examples describing several preferred embodiments thereof.

Example I

One hundred (100) parts of "Buna-N" of relatively high molecular weight, a copolymer of 85 parts by weight of butadiene with 15 parts by weight of acrylonitrile, was dissolved in 500 milliliters of a mixture of seven parts of toluene and 3 parts of nitroethane. The solution was heated to a temperature of 85° C. while being mixed constantly. At this point 20 parts of an 85 per cent phosphoric acid solution was added and the acidified mixture was allowed to react under reflux at about 85° C. for 3 hours. After the reaction time, the mixture was cooled, treated with a concentrated sodium carbonate solution and washed until free of salt. In the sodium carbonate treatment, the reaction mixture was washed with sodium carbonate until unreacted phosphoric acid had been neutralized to a sufficient extent to bring the pH of the solution to a value between 3 and 7, preferably to about 6.

The polymer remaining was dissolved in the mixture of toluene and nitroethane and the solution evaporated to dryness to recover the rubberlike phosphoric acid-modified butadiene-acrylonitrile polymer in a sheet form suitable for milling and compounding.

Example II

One hundred (100) parts of a "Buna-N," a copolymer of 75 parts of butadiene with 25 parts of acrylonitrile of high molecular weight, was dissolved in about 500 parts of a mixture of 70 parts methyl ethyl ketone and 30 parts nitroethane and the solution heated to a temperature of about 60° C. To the heated solution there was added about 15 parts of pyro-phosphoric acid, the mixture was maintained at the temperature of 60° C. and allowed to react for 4 hours. The reaction mixture was then cooled, treated with concentrated sodium carbonate solution to reduce its pH to a value of about 5, was then washed until free of salt and redissolved in a solvent comprising methyl ethyl ketone and nitroethane. The solution of the phosphoric acid-modified polymer was allowed to evaporate and the rubber-like material thus obtained was recovered in the form of sheets suitable for milling or compounding.

Example III

One hundred (100) parts of a "Buna-N" polymer comprising a soft copolymer of 65 parts of butadiene with 35 parts of acrylonitrile was dissolved in 500 parts of ethylene dichloride. The solution was heated to a temperature of about 90° C., there was added thereto about 10 parts of phosphoric acid, the mixture was maintained at the temperature of about 90° and allowed to react for about 6 hours. The reaction mixture was finally cooled, treated with concentrated sodium carbonate solution to reduce its pH to about 4, washed until free of salt and redissolved in ethylene dichloride. The solution of the modified polymer was allowed to evaporate and the rubberlike polymer thus obtained was recovered in the form of sheets suitable for milling or compounding.

From the above examples, one aspect of my invention, the method of modifying butadiene acrylonitrile polymers with phosphoric acid to obtain thereby a product suited to incorporation into adhesive compositions, will be understood. The incorporation of the modified polymer into adhesive compositions will be described in the following examples which represent a few preferred embodiments thereof.

Example IV

An adhesive composition was prepared containing the following ingredients:

| | Parts by weight |
|---|---|
| Phosphoric acid polymer (prepared according to method of Example I) | 100 |
| Titanium dioxide | 25 |
| Zinc oxide | 10 |
| Dibutyl phthalate | 5 |
| Zenite (zinc benzo thiazyl sulfide) | 1.5 |
| Ethyl tuads (tetra ethyl thiuram disulfide) | 1.5 |
| Sulfur | 1.5 |

The pigmented adhesive composition was prepared by milling together the ingredients listed above in the order named to obtain thereby a tough, tacky mass of compounded polymeric material which was used as an adhesive base. When the pH of the cement base is between 3 and 7 and it is dissolved in a solvent such as ethylene dichloride, methyl ethyl ketone, or nitroethane-toluene mixture to give a free-flowing solution, it remains stable or non-gelling for periods as long as 6 months. For use in laminating sheets of fabric and cementing materials to metal and nonmetallic surfaces, it is simply necessary to apply the cement to the area to be covered, apply the fabric and allow about 48 to 96 hours for drying and setting.

The pigment incorporated in the composition may be any metal oxide such as those listed or other similar oxides which will function not only to pigment the composition but also to take up acid released in the curing. From 10 to 40 parts by weight of pigment may be used.

Example V

An adhesive composition was prepared containing the following ingredients:

| | Parts by weight |
|---|---|
| Phosphoric acid polymer (like that prepared by methods of any of the examples) | 100 |
| Titanium dioxide | 25 |
| Zinc oxide | 10 |
| Tricresyl phosphate | 5 |
| Methyl tuads (tetra methyl thiuram disulfide) | 2 |
| Butyl eight (mixture of esters of dithiocarbamic acid) | 4 |

The above compositions, which like that of Example IV is typical of the pigmented cements which can be prepared from the modified polymer, was incorporated into several cements of different fluidities by dissolving it in amounts from 20 to 50 parts by weight in solvents such as those mentioned in connection with the above examples. The compositions, with pH values ranging from 3 to 7, made useful cements for laminating fabrics and for cementing fabrics to dissimilar surfaces. They also formed good coating or sealing compounds for the interiors of several metal fuel tanks for an airplane. The tanks were coated therewith to seal the seams and, after 48 hours for drying, they were capable of carrying aromatic blend fuels with no adverse effect on the coating.

Example VI

An adhesive composition was prepared containing the following ingredients:

| | Parts by weight |
|---|---|
| Phosphoric acid polymer (like that of any of the examples) | 100 |
| Sulfur | 2 |
| Butyl eight | 4 |
| Tuads | 2 |

The above unpigmented compositions, with the ingredients milled together in the order listed, when taken into solution in solvents such as ethylene dichloride, methyl ethyl ketone or nitroethane-toluene mixtures, forms an excellent cement of general utility for purposes of laminating fabrics, rubber sheets and cementing fabrics and rubber sheets to metal surfaces. After it has had time to dry, about 48 hours, it sets to a firm, strong, inert, aromatic fuel resistant bond.

As will be noted from the above examples, sulfur is used as the primary vulcanizing agent in much the same manner in which it is used as a vulcanizing agent in natural or synthetic rubber. However, by the incorporation of the sulfur in the composition in the proportions of about ½ to about 4 parts and with the balancing ingredients described, it is possible to obtain final adhesive compositions, pigmented or unpigmented, which are capable of effecting a self-cure. Upon being applied to a surface as an adhesive agent the cements will dry and cure without the application of heat thereto. This property is markedly different from that of more or less conventional adhesive cement compositions in that most, if not all, of the cements known to the art require the application of heat to effect a cured bond.

Among the ingredients in the composition it will be noted that accelerators typified by "Zenite" and "Tuads" (zinc benzo thiazyl sulfide and tetra ethyl thiuram disulfide) have been included in varying proportion. In general, for the purposes of the composition mentioned, it will be found that accelerators in the proportions of about 1½ to about 7 parts by weight can be used. Those compositions in which relatively high proportions of accelerator, about 7 parts, are used will be found to be somewhat less stable in solution than are those compositions containing smaller proportions of accelerator. As this is undesirable from 1.5 to 4 parts may be used. In this connection, it should be noted that in the preparation of the phosphorous acid-modified polymers it was stated that the polymer should be prepared to have a pH of about 3 to 7 which pH has been found contributes to its stability. When a polymer, or a finished composition, is used which has a pH within this range, it will be found that proportions of accelerator ranging from 2 to about 3 parts by weight approximately match the pH range from obtaining an optimum stability of the adhesive composition solution. The initial reaction of the polymer with acid may be carried out in the range between 50° C. and 100° C.

The plasticizer may be present in amounts from 1 to 10 parts.

The term "stability" has been used to describe a property of the adhesive composition. By stability of the composition in solution I mean the composition can be prepared in its entirety, all ingredients being placed in the same solvent or vehicle, and at the same time an adhesive composition or solution is produced which will be stabled at room temperatures for periods as long as about 6 months or more. In the past, compositions have not been sufficiently stable to permit their standing for any appreciable length of time. That is, adhesive compositions of the nature of those described above have been available but in relatively unstable form in that, once prepared in the vehicle, the composition had to be used within a period of 12 to 24 hours in order to avoid its gelling. Generally, as pointed out above, stability is somewhat related to the pH of the composition and the proportion of accelerator present. I have found that by preparing compositions having a pH of about 3 to 7 and matching the accelerator proportion accordingly, I have been able to prepare adhesive compositions which will stand at room temperature as solutions in a single vehicle for periods of longer than 6 months with no signs of gelling.

Figure 2:
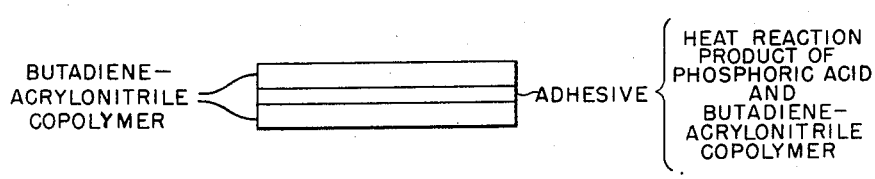

Figures 1 and 2 of the accompanying drawing show embodiments of the invention in the form of laminated products.

The production of laminated products, such as laminated synthetic linear polyamide (nylon) and cellulosic fabrics for various structural purposes, is very simple with adhesive compositions such as those described above in that it involves merely spraying the fabric or brushing it with the composition, placing it in contact with the second, pressing the two to an even adhesion so as to leave between the sheets a uniform coating of material and permitting the solvent to evaporate. Laminated nylon and cellulosic products made in that form, which consisted of 6, 8 and 10 layers of fabric were tested for their aromatic-blend fuel resistance by permitting them to soak for 96 hours while submerged in an aromatic-blend fuel. In no case was there a loss of more than 20 to 25 per cent in the strength of the bond between the layers of the product.

A similar test was carried out with sheets of "Buna-N" cemented to sheets of "Buna-N" with adhesive compositions like those described above. After 96 hours of submergence in aromatic blend fuel, samples showed no detectable loss in strength of the bond.

The adhesion of the materials for metal surfaces, as typified by their adhesion to aluminum was tested by coating aluminum sheets with films, about 0.05 inch thick, of compositions like those described in Examples IV through VII. In all cases, after five weeks submergence in aromatic-blend fuels, the films thus placed on the aluminum and other metals were unaltered.

Corresponding tests made with other analogous adhesive compositions containing unmodified "Buna-N" and having uncontrolled pH value, as well as accelerator proportions not balanced as described, gave films which within relatively short periods swelled and lifted away from the metal surfaces to which applied.

Since certain changes in carrying out the above process and certain modifications in the compositions which embody the invention may be made without departing from its scope, it is intended that all matter contained in the above description shall be interpreted as illustrative and not in a limiting sense.

The invention described herein may be manufactured and used by or for the Government of the United States of America for governmental purposes without the payment of any royalties thereon or therefor.

Having described my invention, what I claim as new and desire to secure by Letters Patent of the United States is:

1. An adhesive composition comprising the heat reaction product of a mixture including as the sole essential reactive constituents a copolymer of butadiene and acrylonitrile having a molecular weight of about 50,000 to 150,000 and containing about 15% to about 50% of acrylonitrile and a phosphoric acid selected from the group consisting of orthophosphoric and pyrophosphoric acids as the base, a metallic oxide acid-accepting pigment, a plasticizer, a curing agent, and a solvent therefor.

2. A self-curing composition comprising the heat reaction product of a mixture including as the sole essential reactive constituents a copolymer of butadiene and acrylonitrile having a molecular weight of about 50,000 to 150,000 and containing about 15% to about 50% of acrylonitrile and a phosphoric acid selected from the group consisting of orthophosphoric and pyrophosphoric acids as the base, a metallic oxide acid-accepting pigment, a plasticizer of low aromatic hydrocarbon solubility, sulphur, a sulphur accelerator, and a solvent therefor.

3. A self-curing composition comprising the heat reaction product of a mixture including as the sole essential reactive constituents a polymer of butadiene and acrylonitrile having a molecular weight of about 50,000 to 150,000 and containing about 15% to about 50% of arcylonitrile and a phosphoric acid selected from the group consisting of orthophosphoric and pyrophosphoric acids as the base, a metallic oxide acid-accepting pigment, a plasticizer of low aromatic hydrocarbon solubility, sulphur, a sulphur accelerator, and a solvent therefor, the pH of said composition being between 3 and 7.

4. A self-curing adhesive composition, comprising about 100 parts of the heat reaction product of a mixture including as the sole essential reactive constituents a copolymer of butadiene and acrylonitrile having a molecular weight of about 50,000 to 150,000 and containing about 15% to about 50% of acrylonitrile and a phosphoric acid selected from the consisting of orthophosphoric and pyrophosphoric acids, about 10 to about 40 parts of inorganic acid acceptor comprising a metallic oxide, about 1.5 to about 4 parts of curing accelerator, about 1 to about 10 parts of plasticizer of low solubility in aromatic hydrocarbons and a solvent for said composition, the pH of said composition being between 3 and 7.

5. A self-curing adhesive composition, comprising about 100 parts of the heat reaction product of a mixture including as the sole essential reactive constituents a copolymer of butadiene and acrylonitrile having a molecular weight of about 50,000 to 150,000 and containing about 15% to about 50% of acrylonitrile and a phosphoric acid selected from the group consisting of orthophosphoric and pyrophosphoric acids, about 1.5 to about 4 parts of a sulphur-bearing accelerator, about 1 to about 10 parts of a plasticizer substantially insoluble in aromatic hydrocarbons, and a solvent for said composition, said composition having a pH between 3 and 7.

6. A method of treating a copolymer of butadiene and acrylonitrile containing about 15-50% of acrylonitrile and having a molecular weight of from about 50,000-150,000 which comprises reacting a solution of the copolymer at a temperature of about 50-100° C. solely with a reactant consisting essentially of a phosphoric acid selected from the group consisting of ortho-phosphoric acid and pyro-phosphoric acid, and adjusting the pH of the treated copolymer to a value of about 3-7.

7. A method of treating a copolymer of butadiene and acrylonitrile containing about 15-50% of acrylonitrile and having a molecular weight of from about 50,000-150,000 which comprises reacting a solution of the copolymer at a temperature of about 50-100° C. solely with a reactant consisting essentially of a phosphoric acid selected from the group consisting of ortho-phosphoric acid and pyro-phosphoric acid, adjusting the pH of the treated copolymer to a value of about 3-7 by partial neutralization, and recovering the product by evaporation of the solution substantially to dryness.

8. A method of treating a copolymer of butadiene and acrylonitrile containing about 15-50% of acrylonitrile and having a molecular weight of from about 50,000-150,000 which comprises reacting a solution of the copolymer at a temperature of about 50-100° C. for about 3 hours solely with a reactant consisting essentially of a phosphoric acid selected from the group consisting of ortho-phosphoric acid and pyro-phosphoric acid, adjusting the pH of the treated polymer to a value of about 3-7 by partial neutralization, and recovering the product by evaporation of the solution substantially to dryness.

9. The method of preparing an adhesive copolymer comprising, reacting a solution including as the reactive component about 100 parts of a copolymer of butadiene and acrylonitrile having a molecular weight of from about 50,000 to about 150,000 and containing from about 15% to about 50% of acrylonitrile solely with a reactant consisting essentially of about 20 parts of otho-phosphoric acid, holding the reaction mass at a temperature of from about 50° C. to about 100° C., adjusting the pH of the mass to from about 3 to about 7, and recovering the modified polymer.

10. The method of preparing an adhesive copolymer comprising, reacting a solution including as the reactive component about 100 parts of a copolymer of butadiene and acrylonitrile having a molecular weight of from about 50,000 to about 150,000 and containing from about 15% to about 50% of acrylonitrile solely with a reactant consisting essentially of about 20 parts of pyro-phosphoric acid, holding the reaction mass at a temperature of from about 50° C. to about 100° C., adjusting the pH of the mass to from about 3 to about 7, and recovering the modified polymer.

11. An adhesive composition comprising the heat reaction product of a mixture including as the sole essential reactive constituents a copolymer of butadiene and acrylonitrile having a molecule weight of from about 50,000 to about 150,000 and containing from about 15% to about 50% acrylonitrile and a phosphoric acid selected from the group consisting of otho-phosphoric acid and pyro-phosphoric acid, the adhesive composition having a pH of from about 3 to 7.

12. A laminated article of manufacture comprising layers of a synthetic linear polyamide bonded with a composition comprising as a base, the heat reaction product of a mixture including as the sole essential reactive constituents a copolymer of butadiene and acrylonitrile having a molecular weight of about 50,000 to 150,000 and containing about 15% to about 50% acrylonitrile and a phosphoric acid selected from the group consisting of ortho-phosphoric and pyrophosphoric acid.

13. A laminated article of manufacture comprising layers of a copolymer of butadiene and acrylonitrile bonded with a composition comprising as a base, the heat reaction product of a mixture including as the sole essential reactive constituents a copolymer of butadiene and acrylonitrile having a molecular weight of about 50,000 to 150,000 and containing about 15% to about 50% acrylonitrile and a phosphoric acid selected from the group consisting of ortho-phosphoric and pyro-phosphoric acid.

ALBERIC T. DI MASI.

REFERENCES CITED

The following references are of record in the file of this patent:

UNITED STATES PATENTS

| Number | Name | Date |
|---|---|---|
| 2,137,584 | Ott | Nov. 22, 1938 |
| 2,277,941 | Almy | Mar. 31, 1942 |
| 2,378,695 | Fryling | June 19, 1945 |
| 2,379,552 | Teppema et al. | July 3, 1945 |
| 2,380,473 | Stewart | July 31, 1945 |
| 2,395,071 | Sarbach | Feb. 19, 1946 |

FOREIGN PATENTS

| Number | Country | Date |
|---|---|---|
| 536,876 | Great Britain | May 30, 1941 |

OTHER REFERENCES

Koch: "Buna Rubbers," Ind. and Engineering Chemistry, April 1940, pages 464–467.